United States Patent
Breau et al.

(10) Patent No.: US 8,130,722 B1
(45) Date of Patent: Mar. 6, 2012

(54) ACCESS TECHNOLOGY AGNOSTIC FOREIGN AGENT

(75) Inventors: Jeremy R. Breau, Kansas City, MO (US); Manish Mangal, Overland Park, KS (US); Arun Santharam, Olathe, KS (US); Brent Hirschman, Overland Park, KS (US); Serge M. Manning, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 990 days.

(21) Appl. No.: 11/835,639

(22) Filed: Aug. 8, 2007

(51) Int. Cl.
 *H04W 4/00* (2009.01)
(52) U.S. Cl. .................................. 370/331; 370/332
(58) Field of Classification Search .................. None
 See application file for complete search history.

(56) References Cited

U.S. PATENT DOCUMENTS

| | | | |
|---|---|---|---|
| 6,956,846 B2 | 10/2005 | Lewis et al. | |
| 6,973,309 B1 | 12/2005 | Rygula et al. | |
| 2004/0193712 A1* | 9/2004 | Benenati et al. | 709/225 |
| 2005/0136920 A1* | 6/2005 | Rink et al. | 455/433 |
| 2008/0205342 A1* | 8/2008 | Radhakrishnan et al. | 370/331 |

OTHER PUBLICATIONS

Inventor(s): Hirschman, Brent, et al. U.S. Appl. No. 11/538,142 Title: An Access Gateway filed Oct. 3, 2006.
Inventor(s): Rogers, Frederick C., et al. U.S. Appl. No. 11/696,480 Title: A Gateway Assignment Function filed Apr. 4, 2007.
WiMAX Forum Proprietary; WiMAX Forum Network Architecture (Stage 3: Detailed Protocols and Procedures)—Release 1.0.0; Mar. 28, 2007.
C. Perkins; IP Mobility Support [Request for Comments: 2002]; IBM; Oct. 1996.
C. Perkins; IP Mobility Support for IPv4 [Request for Comments: 3220]; Nokia Research Center; Jan. 2002.
C. Perkins; IP Mobility Support for IPv4 [Request for Comments: 3344]; Nokia Research Center; Aug. 2002.

* cited by examiner

*Primary Examiner* — Chi Pham
*Assistant Examiner* — Kouroush Mohebbi

(57) ABSTRACT

A system and a method for enabling network communications between mobile client devices and home networks without regard to the access technology employed by the mobile client device. A system is provided that includes a plurality of mobile nodes configured to communicate over a network using different access technologies. Some of the mobile nodes, for example, may communicate using CDMA. Others may communicate using WiMAX. Still others may use other access technologies. The system also includes a foreign agent. The foreign agent is configured to provide foreign agent services to mobile nodes using different access technologies.

19 Claims, 5 Drawing Sheets

ACCESS TECHNOLOGY AGNOSTIC FOREIGN AGENT

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

The present invention provides systems and methods for enabling network communications between mobile client devices and home networks without regard to the access technology employed by the mobile client device. In one aspect of an embodiment of the present invention, a system is provided that includes a plurality of mobile nodes. The mobile nodes are configured to communicate over a network using different access technologies. Some of the mobile nodes, for example, may communicate using CDMA. Others may communicate using WiMAX. Still others may use other access technologies. The system also includes a foreign agent. The foreign agent is configured to provide foreign agent services to mobile nodes using different access technologies.

In another aspect of an embodiment of the present invention, a computer-implemented method is provided for enabling network communications between network elements and home networks. A request is received from a network element requesting to register for foreign agent services. In response to this request, an association between the request and the network element is stored. The request is then relayed to a foreign agent device. A response is later received from the foreign agent device indicating that the registration was granted. Finally, the stored association is utilized to return the response to the appropriate network element so as to establish foreign agent services, including network communications between the network element and a home network.

In yet another aspect of an embodiment of the present invention, a system is provided that includes two or more access gateways. Each access gateway is configured to communicate with one of more of mobile nodes. The system also includes a foreign agent. The foreign agent is configured to provide foreign agent services to a plurality of mobile nodes. The foreign agent is configured to provide such services through communication with multiple access gateways. The foreign agent may service a plurality of mobile nodes, wherein a portion of the mobile nodes are in communication with a first access gateway and a portion of the mobile nodes are in communication with a second access gateway.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

Figure 1:
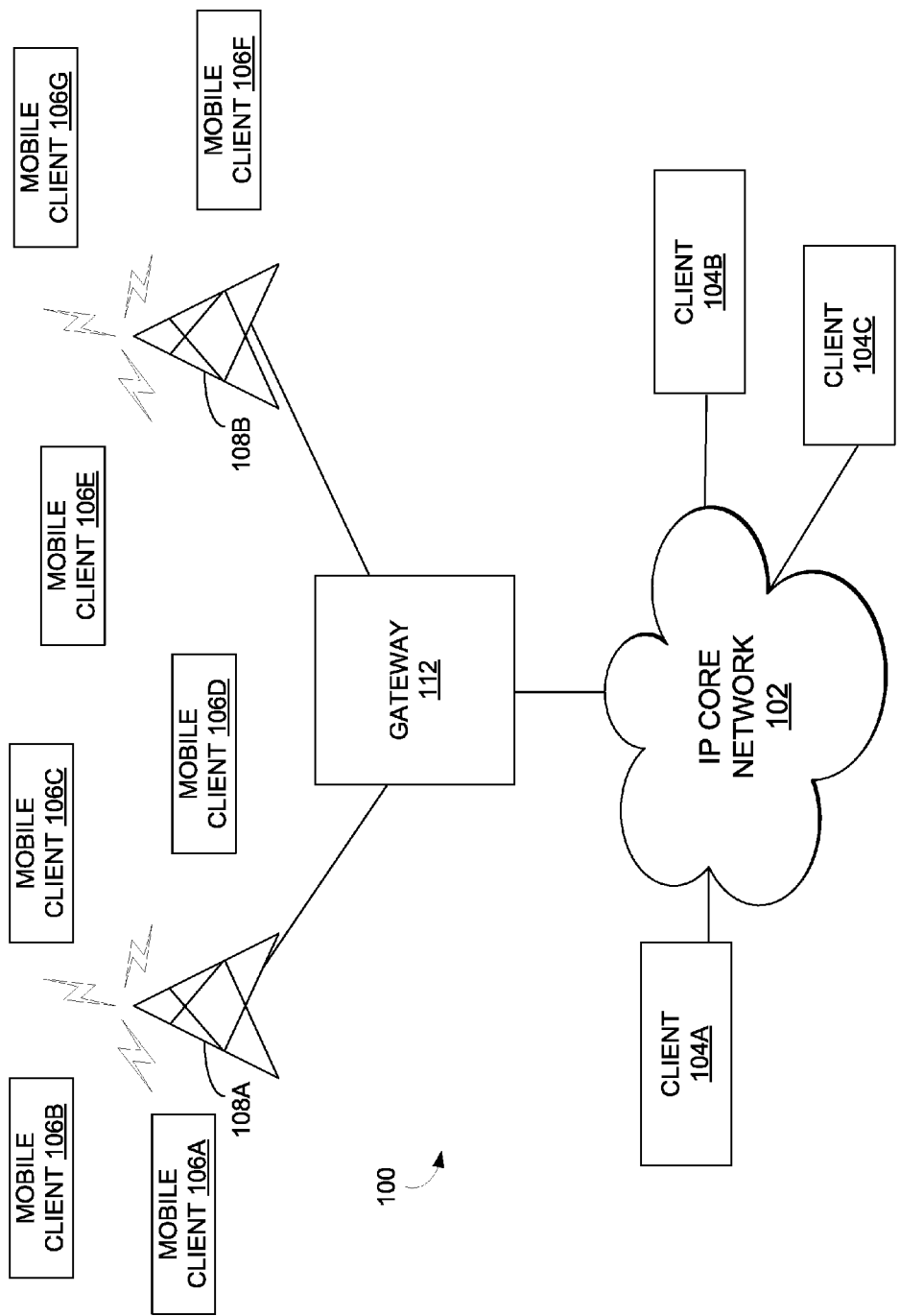
FIG. 1 is a block diagram of a network environment suitable for use in implementing the present invention.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for enabling network communications between mobile client devices and home networks. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data. Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

The present invention may be practiced in any network environment such as a communications network. Such networks are widely used to connect various types of network elements, such as routers, servers, gateways, network telephones, and so forth. Further, the invention may be practiced in a multi-network environment having various, connected public and/or private networks. The networks may be wireless or wireline ("wired"). As will be appreciated by those skilled in the art, communication networks may take several of different forms and may use several different communication protocols.

Typically, users of a wireless communication system are equipped with one or more wireless terminals or "mobile client devices," which may take any of a variety of forms. By way of example, a mobile client device may be a telephone, a pager, a computer, a personal digital assistant ("PDA") or any combination of these or other devices. A mobile client device may be configured to receive and/or convey information such as voice and data (e.g., fax, e-mail and other text messages) and/or other media (e.g., audio, video and graphics). Further, the client device may include input and output facilities such as a touch-pad, a keyboard, a camera, a display, a microphone and/or a speaker. Some client devices are equipped with web browsing software to allow subscribers to communicate with web servers over an Internet Protocol (IP) network (i.e., the Internet).

Mobile client devices may communicate with networks using a variety of different access technologies. For example, Code Division Multiple Access (CDMA) is a packet-based wireless-access technology that may be used in certain cellular phone systems. As another example, Wi-Fi is an access technology based on a series of specifications from the Institute of Electrical and Electronics Engineers (IEEE) called 802.11. Wi-Fi uses radio frequency and enables a wireless-enabled computer or PDA to connect to the Internet via a wireless access point. Yet another access technology being utilized today is commonly referred to as WiMAX (Worldwide Interoperability for Microwave Access). WiMAX, also known as the IEEE 802.16 group of standards, defines a packet-based wireless technology that provides high-throughput broadband connections over long distances.

Mobile client devices may change location and attach to different networks or different parts of the same network. Foreign agent services, in part, allow a mobile client device (or "mobile node") to receive network messages while attached to a network other than their home network (referred to as a "foreign network"). Often this process is facilitated by a network device called a foreign agent. The foreign agent is attached to the foreign network. When a mobile node initiates communication with the foreign network, it registers with the foreign agent and provides information about a home agent, which resides on the mobile node's home network. The foreign agent in turn registers its services with the home agent. In operation, the home agent receives messages on behalf of the mobile node on the mobile node's home network and forwards them through a "tunnel" to the foreign agent on the foreign network. The foreign agent in turn relays the messages on to the mobile node. For further information, see RFC 3344, incorporated herein by reference.

FIG. 1 illustrates a network environment 100 that represents an exemplary environment in which the present invention may be practiced. It is important to note that network environments in which the present invention may operate may be arranged in a variety of configurations, and the network environment 100 of FIG. 1 provides only one exemplary network environment.

The network environment 100 includes an IP core network 102. The network 102 may be any network or combination of networks configured to provide communications between network elements. The network 102 provides communication services for clients 104A-104C. The clients 104A-104C may be any computing devices connected to the network 102, and each of the clients 104A-104C may have an address, such as an Internet protocol (IP) address, for uniquely identifying that client. The clients 104A-104C may interact with the network 102 to receive a variety of content such as voice, data or video.

The network environment 100 may also include a wireless communication system configured to provide communication services to mobile clients 106A-106F. In an exemplary wireless communication system, each mobile client 106A-106F may communicate via an air interface with a base transceiver station 108A or a base transceiver station 108B. The base transceiver stations 108A and 108B may be coupled to any number of different devices that enable connectivity with the network 102, the public Internet and/or a private intranet (e.g., a wireless carrier's core network). The base transceiver stations 108A and 108B may utilize any number of wireless access technologies or standards known in the art to communicate with the mobile clients 106A-106F.

In order to facilitate communication sessions originating from the mobile clients 106A-106F, the network environment 100 includes a gateway 112. As known to those skilled in the art, the gateway 112 may provide a variety of functions allowing clients to communicate with the IP core network 102. Such functions may vary based on the type of access technology being utilized by an originating client device. The gateway 112 may receive communication requests from the mobile clients 106A-106F, authenticate the clients and assign IP addresses.

Figure 2:
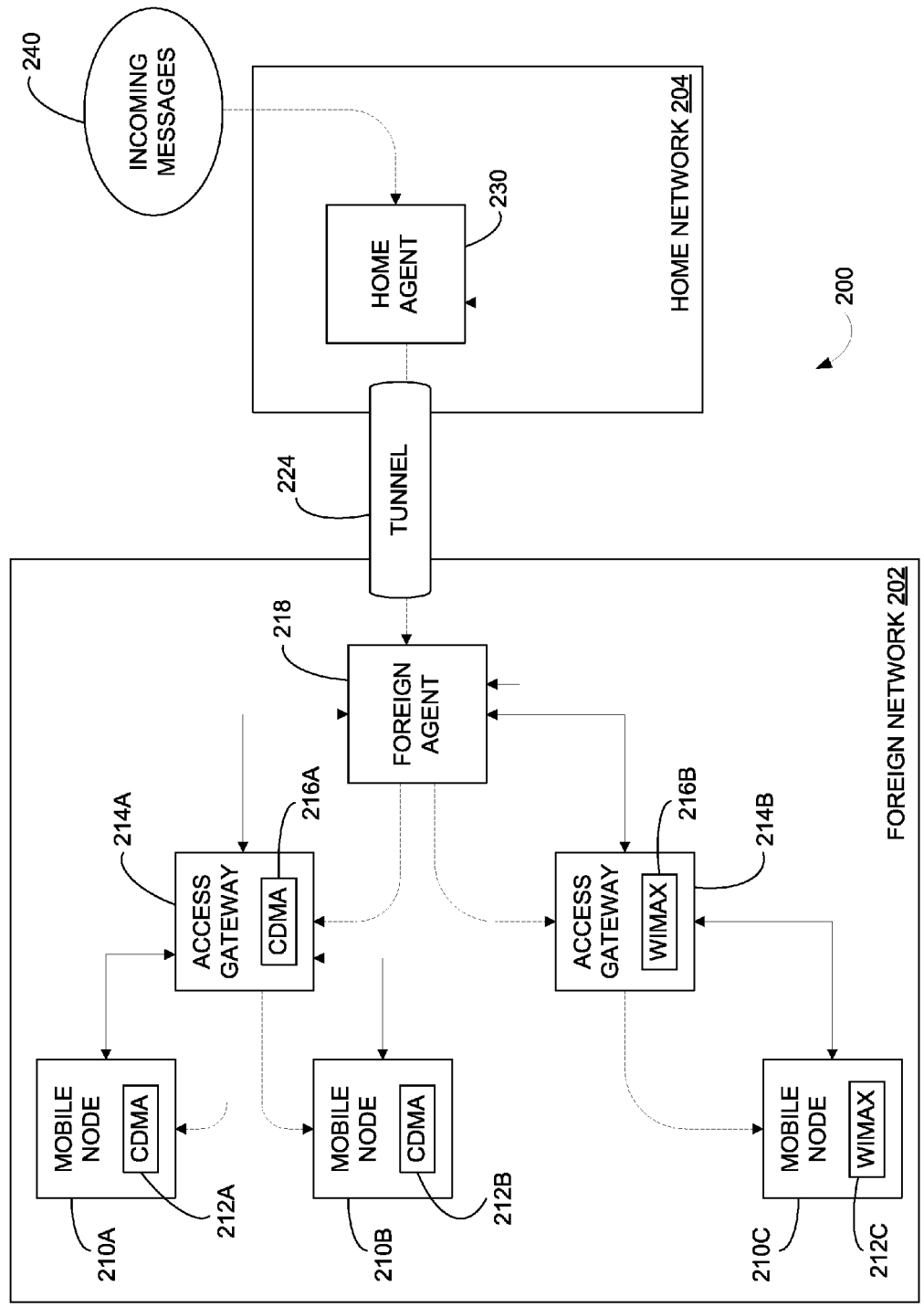
FIG. 2 is a block diagram of portions of a foreign network and a home network representing a system for enabling network communications between mobile client devices and home networks in accordance with one embodiment of the present invention.

FIG. 2 illustrates portions of a foreign network 202 and a home network 204 representing a system 200 for enabling network communications between mobile client devices ("mobile nodes") and their home networks. Foreign networks and home networks in which the present invention may operate may be arranged in a variety of configurations and may contain additional components. FIG. 2 merely provides a simplified illustration of such networks in order to illustrate a possible embodiment of a system in accordance with the present invention. In FIG. 2, arrows with solid lines represent session setup signaling and arrows with dashed lines represent the relaying of incoming messages 240 after setup. Session setup signaling will be described first.

The system 200 includes mobile nodes 210A-210C. These mobile nodes 210A-210C may be any number of client devices capable of communicating wirelessly over an air interface. The nodes 210A-210C are attached to the foreign network 202 and are configured to communicate over the foreign network 202 utilizing a variety of access technologies 212A-212C. In this example, the nodes 210A and 210B utilize CDMA and the node 210C utilizes WiMAX. But access technologies 212A-212C are meant to serve only as examples. Other access technologies may be used and each node 210A-210C maybe configured to utilize multiple access technologies. Nodes 210A-210C may also be configured to transition between using different access technologies without ending or interrupting a single network communications session.

In this embodiment of the invention, nodes 210A-210C communicate with access gateways 214A and 214B to initiate a network communications session over the foreign network 202. Gateways 214A and 214B are configured to utilize access technologies 216A and 216B respectively. In this example, the gateway 214A utilizes CDMA so that it can communicate with the nodes 210A and 210B which also utilize this access technology. The gateway 214B utilizes WiMAX so that it can communicate with the node 210C which also utilizes this access technology. But again, these access technologies are meant to serve only as examples. Other access technologies may be used and each of gateways 214A and 214B maybe configured to utilize multiple access technologies.

In this embodiment of the invention, gateways 214A and 214B each communicate with a foreign agent 218 to register foreign agent services for mobile nodes 210A-210C. The Foreign agent 218 is configured to provide foreign agent services to one or more mobile nodes, including relaying incoming messages 240 between the home network 204 and mobile nodes 210A-210C.

In this embodiment of the invention, the foreign agent 218 communicates with a home agent 230 on the home network 204 to further register foreign agent services for mobile nodes 210A-210C. As described further below, the home agent 230 is configured to relay incoming messages 240 between the home network 204 and the foreign network 202 utilizing a tunnel 224. Although only a single home network 204 is illustrated here for simplicity, each mobile node 210A-210C may be associated with a different home network. In fact, each mobile node 210A-210C may be associated with two or more home networks. Each of said home networks having a home agent 230 as described above.

Figure 3:
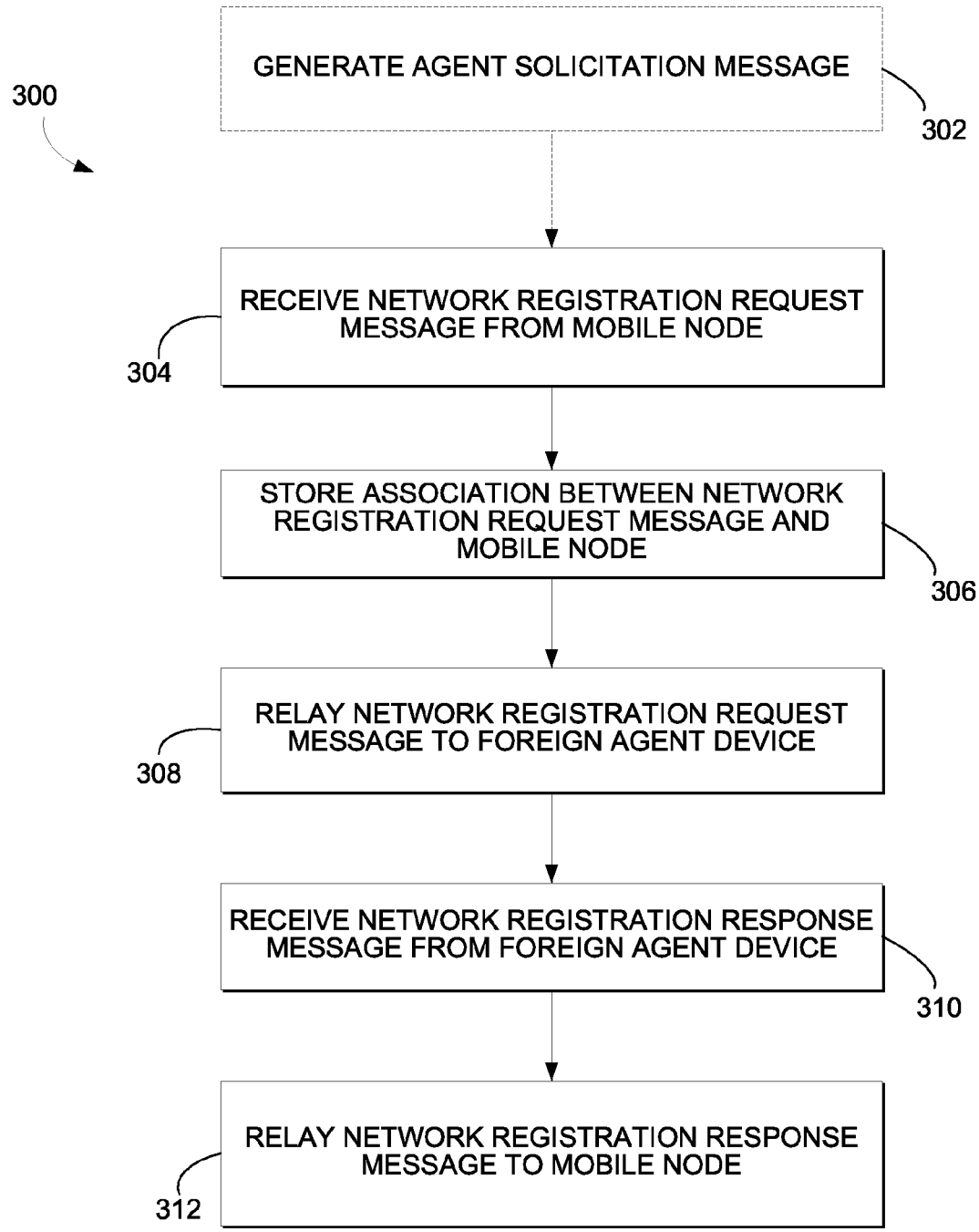
FIG. 3 illustrates a method in accordance with one embodiment of the present invention for enabling network communications between mobile client devices and home networks.
Figure 4:
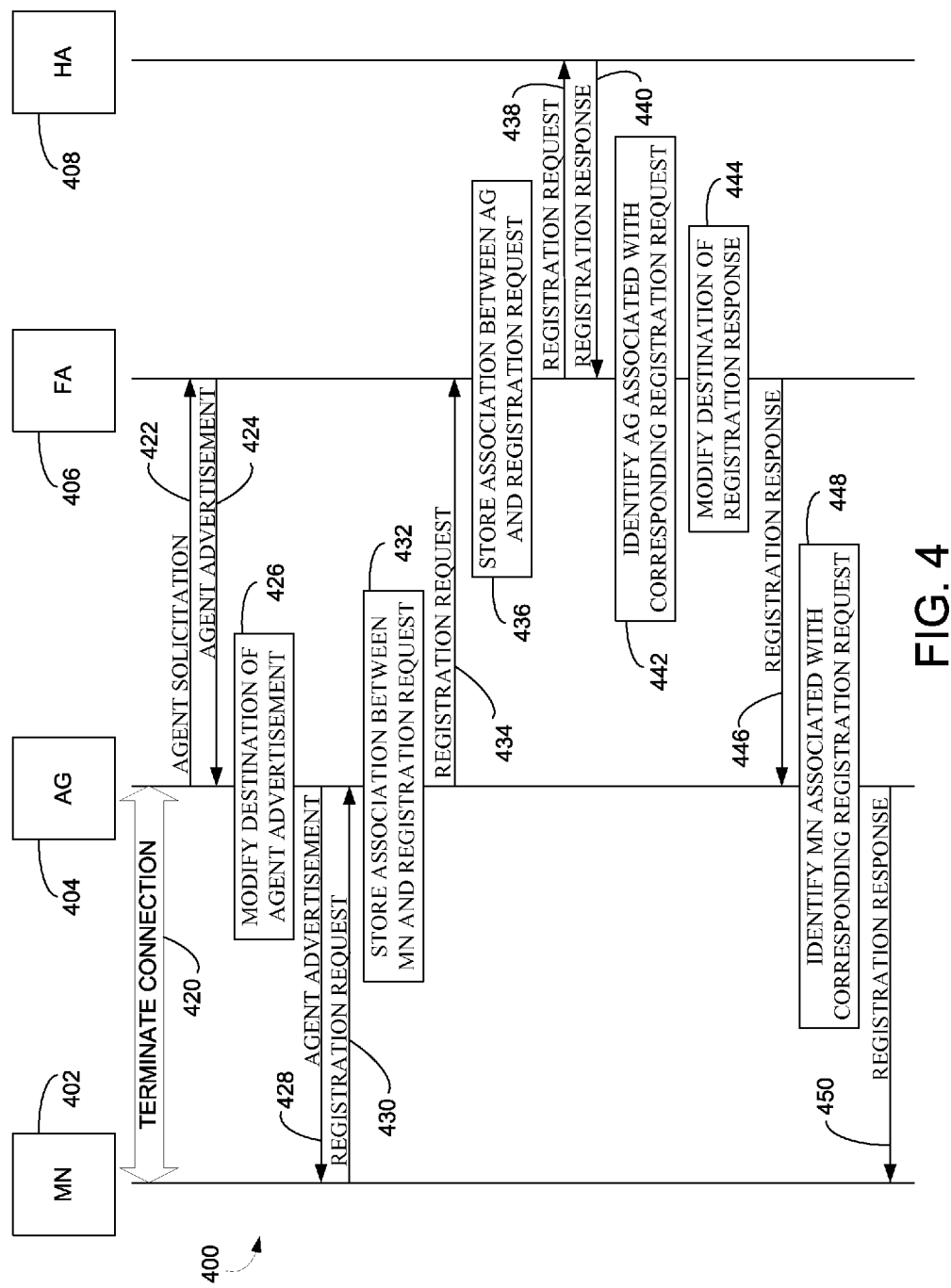
FIG. 4 illustrates a message flow diagram showing an example of session setup signaling in accordance with one embodiment of the present invention.
Figure 5:
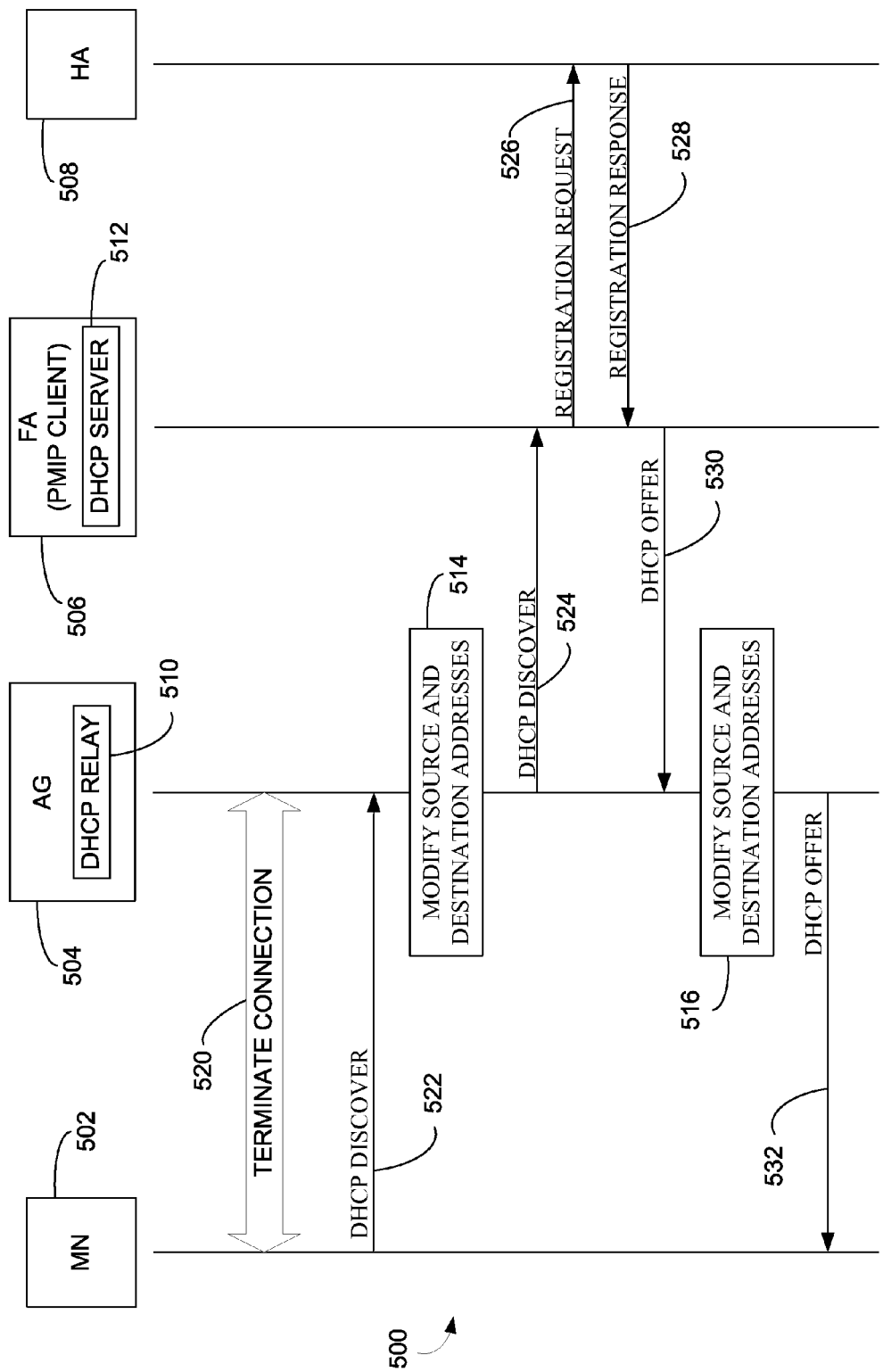
FIG. 5 illustrates a message flow diagram showing an example of session setup signaling in accordance with one embodiment of the present invention.

The process of registering foreign agent services may vary in different embodiments of the present invention. FIG. 3 illustrates a method in accordance with one embodiment of the present invention. FIGS. 4 and 5 illustrate possible message flows in accordance with different embodiments of the present invention.

After foreign agent services are established, the system 200 operates to deliver incoming messages 240 to the appropriate mobile nodes 210A-210C. In one embodiment, the home agent 230 intercepts messages for mobile nodes 210A-210C delivered to the home network 204. The home agent 230 then relays incoming messages 240 to the foreign agent 218 via the tunnel 224. In turn, the foreign agent 218 relays incoming messages 240 to the appropriate mobile nodes 210A-210C. As known in the art, care-of addresses can facilitate the relay of incoming messages 240 to mobile nodes 210A-210C. In a embodiment of the invention, a care-of address is assigned to each of nodes 210A-210C. In a further embodiment of the invention, the care-of addresses assigned to nodes 210A-210C remains constant when nodes 210A-210C transition between using different access technologies.

In the embodiment of invention presented here, this relaying occurs via access gateways 214A and 214B. In different embodiments of the invention, the home agent 230, the foreign agent 218, or access gateways 214A and 214B may alter or augment incoming messages 240 to facilitate their relay. This modification is often referred to as "packing" and "unpacking." Methods of "packing," "tunneling," and "unpacking" messages are well known in the art.

FIG. 3 illustrates a method 300 for enabling network communications between network elements and home networks. The method 300 includes an optional step 302. At this step, the method 300 generates and broadcasts an agent solicitation message which prompts the sending of the request received from the mobile node in the step 304. Once sent, the agent solicitation message may be communicated amongst various elements of the network. For example, the agent solicitation message may be received by a foreign agent device such as foreign agent 218 of FIG. 2. The foreign agent device may then generate an agent advertisement message in response. It is known in the art for an network registration request message to be generated by a mobile node in response to an agent solicitation message. It is also known for an agent advertisement message to be generated in response to a agent solicitation message.

The method 300, at a step 304, receives a network registration request message. The request may originate from one of any number of different client devices equipped to communicate wirelessly with a network. The request may be formatted in accordance with any number of different protocols, and a variety of access technologies may be used to broadcast the request. Once sent from the client device, the request may be communicated amongst various elements of the network before reaching an element configured to perform the method 300. In the embodiment presented here, the request is received from a mobile node such as one of mobile nodes 210A-210C of FIG. 2. In another embodiment, the request is received at a device such as one of access gateways 214A or 214B of FIG. 2.

At a step 306, one or more identifiers associated with the node and the request are stored. For example, an ID field of the network registration request message may be stored in association with a PPP tunnel to the node. Other identifiers may also be used to associate the node and the request.

At a step 308, the request is forwarded to a foreign agent device for further action. And at step 310, a response is received from the foreign agent device. At a step 312, the request and node identifiers stored at the step 306 are utilized to identify the node associated with the request corresponding to the response received in the step 310. For example, as known in the prior art, an ID field associated with the response may be used to match the response to the request. The response is then forwarded to the associated node.

FIG. 4 illustrates a message flow diagram 400 showing an example of session setup signaling in accordance with one embodiment of the present. At a step 420, a mobile node (MN) 402 and an access gateway (AG) 404 terminate a network connection between the MN 402 and the AG 404. Various methods for terminating network connections are well known in the art.

The AG 404 then broadcasts an agent solicitation message at a step 422, which is received by a foreign agent (FA) 406. As is known in the art, the FA 406 responds to the sender, the AG 404, with an agent advertisement message at a step 424.

At a step 426, the AG 404 modifies a destination address field of the agent advertisement message. For example, the destination address is replaced with all 1's. Then, at a step 428, the AG 404 forwards the modified agent advertisement message on to the MN 402. Modifying the destination address field ensures proper message routing. If the destination address field were not modified, the MN 402 may ignore the message in some embodiments of the invention.

At a step 430, the MN 402 responds to the agent advertisement message by sending a registration request message to the sender, the AG 404. Next, at a step 432, the AG 404 stores an association between the MN 402 and the registration request message. A step for storing such an association is illustrated as step 306 of FIG. 3, discussed above. At a step 434, the AG 404 then forwards the registration request message on to the FA 406. At a step 436, the FA 406 stores an association between the AG 404 and the registration request message. This step may be accomplished in a similar manner to that used in the step 432. For example, a MAC address of the AG 404 may be stored in association with an ID field of the registration request message. At a step 438, the FA 406 forwards the registration request message on to a home agent (HA) 408. The HA 408 responds with a registration response message at a step 440.

Next, at a step 442, the FA 406 utilizes the association stored in the step 436 to identify the AG 404 as the appropriate node to receive the registration response message from the step 440. A step for utilizing such an association to identify the appropriate node to receive a registration response message is described in the step 312 of FIG. 3 discussed above. Then, at a step 444, the FA 406 modifies a destination address field of the registration response message from the step 440. This modification may be accomplished in the manner discussed above in the step 426. At a step 446, the modified registration response message is then forward on to the AG 404 identified in the step 442. Modifying the destination address field ensures proper message routing. If the destination address field were not modified, the AG 404 or the MN 402 may ignore the message in some embodiments of the invention.

Next, at a step 448, the AG 404 utilizes the association stored in the step 432 to identify the MN 402 as the appropriate node to receive the registration response message. A step for utilizing such an association to identify the appropriate node to receive a registration response message is described in the step 312 of FIG. 3 discussed above. Finally, at a step 450, the AG 404 forwards the registration response message on to the MN 402.

FIG. 5 illustrates a message flow diagram 500 showing an example of session setup signaling in accordance with one embodiment of the present invention. At a step 520, a mobile node (MN) 502 and an access gateway (AG) 504 terminate a network connection between the MN 502 and the AG 504. Various methods for terminating network connections are well known in the art.

Then, at a step 522, the MN 502 sends a DHCP Discover message to the AG 504. In the manner of a DHCP Relay 510, the AG 504 next modifies the source and destination address fields of the DHCP Discover message at a step 514, before forwarding the DHCP Discover message on to a foreign agent (FA) 506 at a step 524. Modifying the address fields ensures proper routing of the message. In this embodiment of the invention, the FA 506 acts as a PMIP client and a DHCP Server 512.

At a step 526, the FA 506 responds to the DHCP Discover message by sending a registration request message to a home agent (HA) 508. At a step 528, the HA 508 responds with a registration response message. At a step 530, the FA 506 generates a DHCP offer message and passes it to the AG 504. Then, in the manner of the DHCP Relay 510, the AG 504 modifies the source and destination address fields of the DHCP Offer message at a step 516, before forwarding the DHCP Offer message on to the MN 502 at a step 532. Modifying the address fields ensures proper routing of the message.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A system for enabling network communications between mobile nodes and home networks, the system comprising:
   a plurality of mobile nodes configured to communicate over a network, wherein at least a portion of said plurality of mobile nodes utilize a first access technology and at least a portion of said plurality of mobile nodes utilize a second access technology;
   a plurality of access gateways configured to communicate with said plurality of mobile nodes over said network, wherein each of said plurality of access gateways is configured to utilize at least one of said first access technology or said second access technology; and
   a foreign agent configured to relay over said network messages between at least a portion of said plurality of mobile nodes and one or more home networks via at least a portion of said plurality of access gateways, wherein said foreign agent is not integrated with the plurality of access gateways and relays messages over said network to the plurality of access gateways in a manner that is agnostic to whether a message is bound for a mobile node utilizing said first access technology or said second access technology.

2. The system according to claim 1, wherein at least one of said network or said one or more home networks comprises an IP network.

3. The system according to claim 1, wherein at least a portion of said plurality of mobile nodes are configured to utilize both the first access technology and the second access technology.

4. The system according to claim 3, wherein at least a portion of said plurality of mobile nodes transition between utilizing the first access technology and utilizing the second access technology during a network communications session.

5. The system according to claim 4, wherein said foreign agent is configured to relay said messages without interruption during said transition.

6. The system according to claim 4, wherein a care-of address assigned to at least one of said plurality of mobile nodes is maintained before, during and after said transition.

7. The system according to claim 1, wherein at least one of said first access technology and said second access technology are selected from a list including: Code Division Multiple Access (CDMA); IEEE 802.3 standards; IEEE 802.11 standards; and IEEE 802.16 standards.

8. A computer-implemented method for enabling network communications between network elements and home networks, the method comprising:
   receiving a network registration request message from a network element;
   storing an association between the network registration request message and the network element;

relaying the network registration request message to a foreign agent device, wherein said foreign agent device is configured to relay messages, via a plurality of access gateways, for a plurality of mobile nodes utilizing a first access technology and for a plurality of mobile nodes utilizing a second access technology, wherein said foreign agent device is not integrated with the plurality of access gateways and relays said messages to the plurality of access gateways without regard for whether a message is bound for a mobile node utilizing said first access technology or said second access technology;

receiving a network registration response message from the foreign agent device, wherein said network registration response message is associated with a home network; and utilizing said association to relay the network registration response message to the network element so as to enable establishment of a network communications session between said network element and said home network.

9. The method of claim 8, wherein said network element comprises a mobile node.

10. The method of claim 9, further comprising generating an agent solicitation message to initiate communication with said foreign agent device on behalf of said mobile node.

11. The method of claim 8, wherein said association is stored at an access gateway.

12. The method of claim 8, wherein said home network comprises an IP network.

13. A system for enabling network communications between mobile nodes and home networks, the system comprising:

two or more access gateways configured to communicate over a network with a plurality of mobile nodes, wherein at least a portion of said plurality of said two or more access gateways utilize a first access technology and at least a portion of said two or more access gateways utilize a second access technology; and a foreign agent configured to provide one or more foreign agent services to at least a portion of said plurality of mobile nodes by relaying messages between at least a portion of said plurality of mobile nodes and one or more home networks, wherein said foreign agent is configured to perform said one or more foreign agent services for mobile nodes in communication with a plurality of said two or more access gateways, wherein said foreign agent is not integrated with the two or more access gateways and relays said messages to the plurality of access gateways without regard for whether a message is bound for a mobile node utilizing said first access technology or said second access technology.

14. The system according to claim 13, wherein at least one of said first access technology and said second access technology are selected from a list including:

Code Division Multiple Access (CDMA); IEEE 802.3 standards; IEEE 802.11 standards; and IEEE 802.16 standards.

15. The system according to claim 13, wherein a second plurality of said two or more access gateways relay network registration request messages from at least a portion of said plurality of mobile nodes to said foreign agent.

16. The system according to claim 15, wherein said second plurality of said two or more access gateways store one or more associations between said network registration request messages and at least a portion of said plurality of mobile nodes.

17. A system according to claim 16, wherein said second plurality of said two or more access gateways utilize said one or more associations to return network registration response messages to at least a portion of said plurality of mobile nodes.

18. The system according to claim 15, wherein said foreign agent stores one or more associations between said network registration request messages and at least a portion of said plurality of mobile nodes.

19. The system according to claim 18, wherein said foreign agent utilizes said one or more associations to return network registration response messages to at least a portion of said plurality of mobile nodes.

* * * * *